A. L. NASH.
WINDSHIELD SHADE.
APPLICATION FILED MAY 24, 1919.
1,342,347.
Patented June 1, 1920.
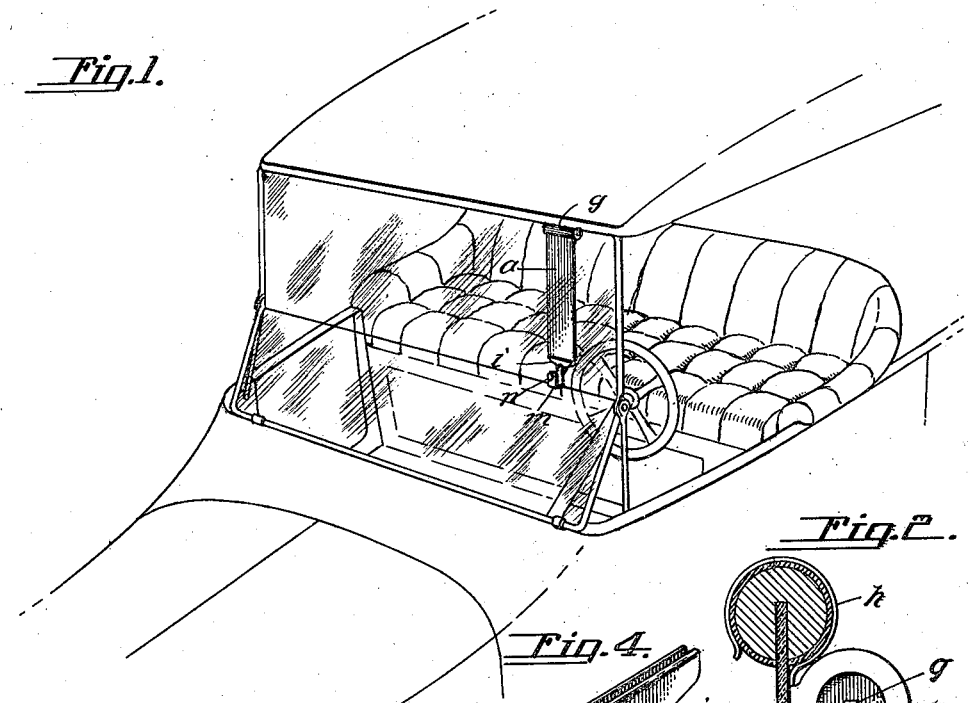
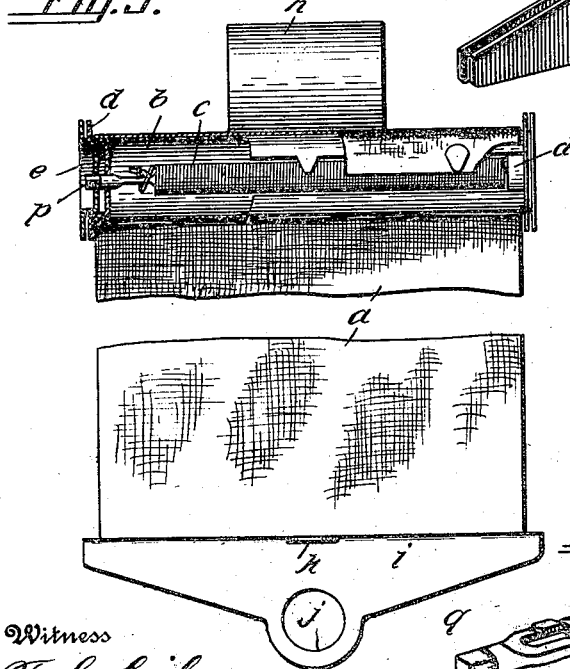
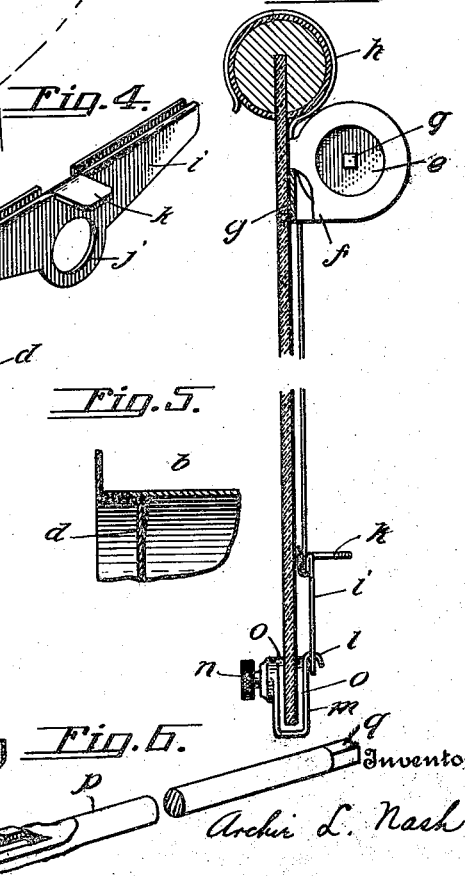
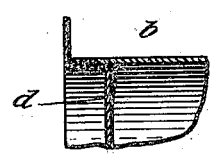
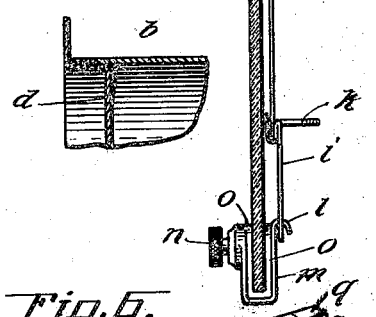

UNITED STATES PATENT OFFICE.

ARCHIE L. NASH, OF EAST SPENCER, NORTH CAROLINA.

WINDSHIELD-SHADE.

1,342,347.  Specification of Letters Patent.  Patented June 1, 1920.

Application filed May 24, 1919. Serial No. 299,444.

*To all whom it may concern:*

Be it known that I, ARCHIE L. NASH, a citizen of the United States of America, and a resident of East Spencer, county of Rowan, and State of North Carolina, have invented certain new and useful Improvements in Windshield-Shades, of which the following is a full and clear specification.

The object of this invention is to provide a simple shade attachment for glass windshields which shall be adapted not only for attachment to any motor vehicle windshield, but also shall be adapted for ready adjustment back and forth across the upper section of the windshield, to the end that it may be nicely positioned with reference to the chauffeur so that it will be in the line of vision between his eyes and the point in the roadway where the glare of an oppositely-going car is likely to appear, as more fully hereinafter set forth.

In the drawings—

Figure 1 is a perspective view of a passenger automobile showing my device applied thereto;

Fig. 2 is a vertical sectional view of the upper section of a windshield showing my device attached thereto;

Fig. 3 is a view partly in section and partly in side elevation of my device detached;

Figs. 4, 5 and 6 are views of details hereinafter described.

Referring to the drawing by reference-characters, $a$ designates a shade which is a comparatively narrow piece of opaque fabric wound at its upper end upon a roller $b$, this roller being actuated by an inclosed coil-spring $c$ in a direction to normally wind-up the shade on the roller. Inset into each of the hollow ends of the roller is a cup $d$, and extending into each of these cups is a knob $e$ formed on a bracket $f$, the circular knobs $e$ serving as journals for the roller. The brackets $f$ are carried by a bar $g$, which bar is adapted to be suspended from the upper edge of the windshield section by means of a spring-hook $h$ which engages over the top bar of the windshield so as to be slidable therealong to enable the shade to be set at any point across the windshield section.

The depending end of the shade is affixed to a sheet-metal strip $i$ which, at the center of its lower edge, is provided with a ring $j$ and which also is provided with a rearwardly-extending thumb-piece $k$. When the shield is pulled down, the ring $j$ is engaged into a hook $l$ carried by a clip $m$ which embraces the lower edge of the wind-shield section and is anchored thereon by a set-screw $n$, a suitable soft packing material $o$ being provided in the clip to prevent the clamping action from breaking the glass. This clip may be adjusted to any point along the lower edge of the glass section.

The coil-spring $c$ surrounds a rod $p$ whose squared ends $q$ fit in squared holes in the bracket bosses $e$, thereby preventing this rod from turning. This rod supports the spring throughout the length thereof.

It will be observed that the shade strip may be adjusted to any desirable point along the windshield section by simply sliding clamp $h$ along the top-bar of the section and by setting the clamp $m$ at a corresponding point along the lower edge of the section. When the shade is not in use, it will be released from the hook $h$ and permitted to normally roll up on the cylinder $b$; should it be desired to remove the shade entirely from the section, this may be done by simply springing the clamp $h$ off the top-rod.

It will be observed that a feature of importance lies in so suspending the roller upon the top-bar of the windshield that the back-bar $g$ of the shade-roller will rest against the inner face of the glass section, thus furnishing a substantial support for the shade-roller.

The nature and scope of the invention having been thus indicated and its preferred embodiment having been specifically described, what is claimed as new is:

In a glare-shade for windshields, a shade-roller carrying a device for slidingly mounting it on the top-bar of the wind-shield, a shade member adapted to wind upon the roller, and means for detachably and adjustably connecting the lower end of the shade to the lower edge of the windshield, so that the shade member may be securely fastened at both ends at any point across the windshield, said means consisting of a clamp embracing the lower edge of the windshield and adapted to be secured at any point along the same, and a hook carried by the lower end of the shade member adapted to be detachably connected to said clamp, whereby the shade member may be rolled up without disconnecting the clamp from the windshield.

In testimony whereof I hereunto affix my signature.

ARCHIE L. NASH.